United States Patent
Kogiso et al.

(10) Patent No.: US 6,665,599 B2
(45) Date of Patent: Dec. 16, 2003

(54) SYSTEM FOR CONTROLLING ELECTRIC POWER STEERING

(75) Inventors: Yoshinori Kogiso, Mizunami (JP); Hisazumi Ishikawa, Tajimi (JP)

(73) Assignee: Kayaba Industry Co., Ltd., Tokyo (JP)

( * ) Notice: Subject to any disclaimer, the term of this patent is extended or adjusted under 35 U.S.C. 154(b) by 151 days.

(21) Appl. No.: 10/033,306

(22) Filed: Dec. 27, 2001

(65) Prior Publication Data

US 2002/0084137 A1 Jul. 4, 2002

(30) Foreign Application Priority Data

Dec. 28, 2000 (JP) ........................................ 2000-399982

(51) Int. Cl.$^7$ ................................................ B62D 5/04
(52) U.S. Cl. ........................... 701/41; 180/443; 180/446
(58) Field of Search ........................... 701/41, 42, 43, 701/44; 180/443, 446

(56) References Cited

U.S. PATENT DOCUMENTS

| | | | | |
|---|---|---|---|---|
| 5,253,725 A | * | 10/1993 | Nishimoto | 180/446 |
| 5,469,357 A | * | 11/1995 | Nishimoto | 701/41 |
| 5,894,205 A | * | 4/1999 | Shimizu et al. | 318/432 |
| 5,992,557 A | * | 11/1999 | Nakamura et al. | 180/446 |
| 6,594,568 B2 | * | 7/2003 | Matsuoka | 701/41 |
| 2002/0043423 A1 | * | 4/2002 | Endo et al. | 180/446 |
| 2002/0056587 A1 | * | 5/2002 | Shibasaki et al. | 180/443 |
| 2002/0060106 A1 | * | 5/2002 | Kogiso | 180/446 |
| 2002/0116105 A1 | * | 8/2002 | Chen et al. | 701/41 |

* cited by examiner

*Primary Examiner*—Gary Chin
(74) *Attorney, Agent, or Firm*—Steinberg & Raskin, P.C.

(57) ABSTRACT

A challenge of the present invention is to provide a system for controlling electric power steering which does not allow a pulsing motion to occur when a steering wheel W is positioned around the middle position. To answer the challenge, the system has signal level decision means 16 for selecting a reference level or an amplification level in response to a steering-torque detection signal or a motor current command-value signal; first adjustment device 17 for carrying out the selection of the reference level or the amplification level for the signal level of the motor current command-value signal; second adjustment device 18 for carrying out the selection of the reference level or the amplification level for the signal level of the motor current detection signal; Ad conversion device 15 for converting the signal sent from the second adjustment signal into a digital signal; and third adjustment device 19 for adjusting the motor current control signal to be at the reference level. Each of the first adjustment device 17 and the second adjustment device 18 decides the signal level in response to a signal level decision signal, and the third adjustment device 19 adjusts the motor current control signal to be at the reference level in response to the signal level decision signal, and then inputs the adjusted signal to output control device 11.

4 Claims, 8 Drawing Sheets

Fig. 7  *Prior Art*
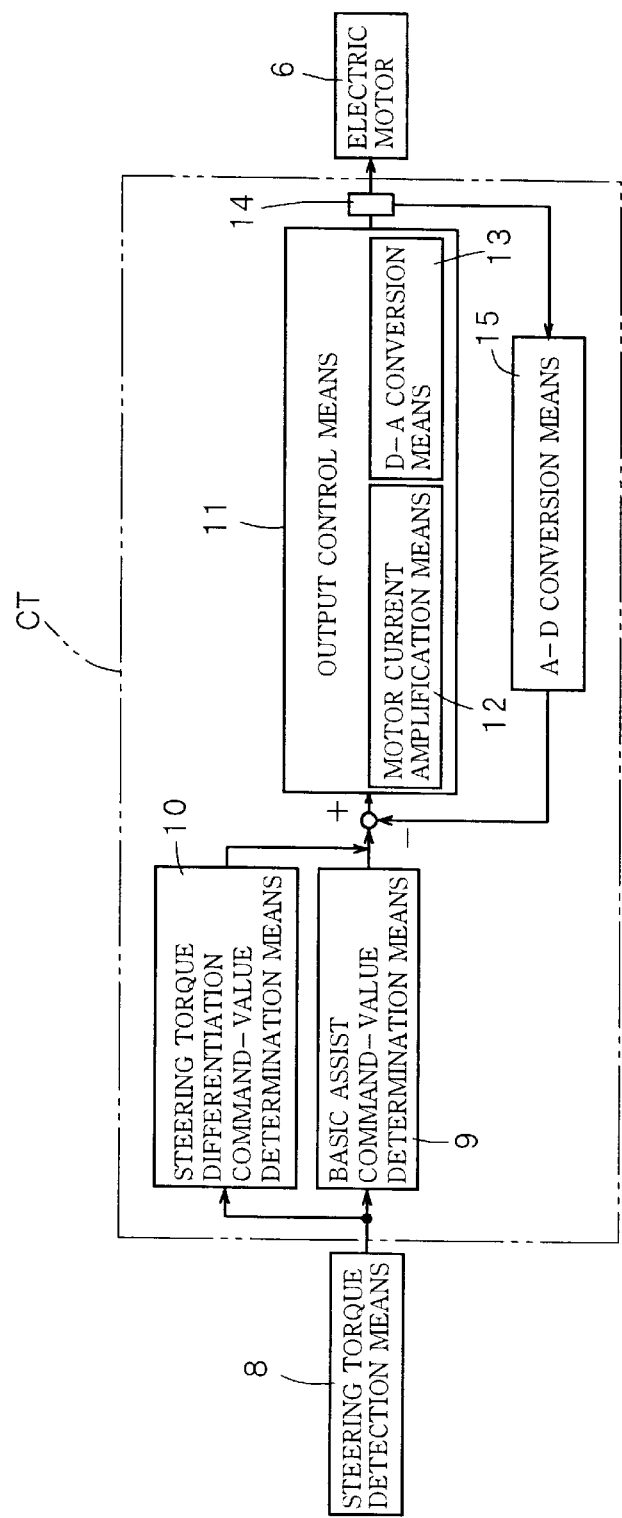

Fig. 8  *Prior Art*
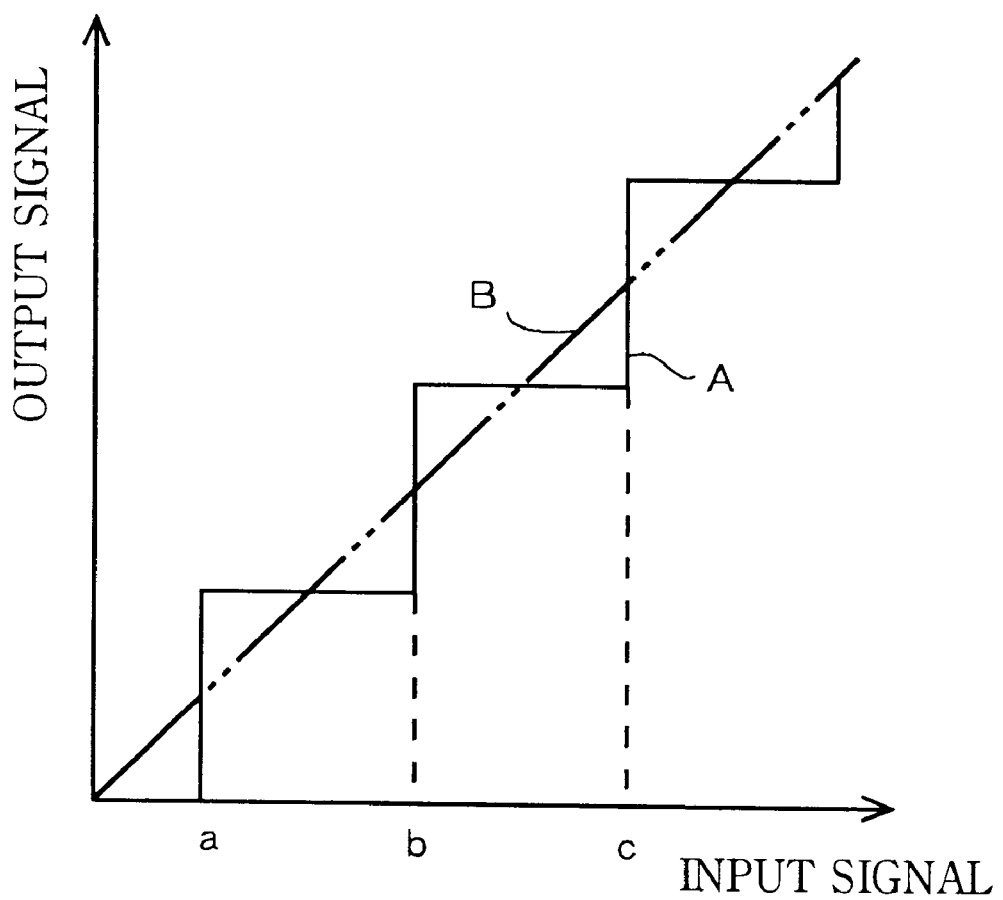

SYSTEM FOR CONTROLLING ELECTRIC POWER STEERING

BACKGROUND OF THE INVENTION

1. Field of the Invention

This invention relates to a system for controlling electric power steering.

2. Description of Related Art

FIG. 6 shows a conventional system for controlling electric power steering. FIG. 7 is a block diagram showing the control in the system for controlling the electric power steering.

As illustrated in FIG. 6, a pinion 2 is placed on one end of an input shaft 1 associated with a steering wheel W. A rack is provided on a rod 4 associated with wheels 3R, 3L at two end portions. The pinion 2 on the input shaft 1 engages the rack 5 on the rod 4.

An electric motor S is associated with a reduction gear 7 having an output shaft on which a pinion is provided. The pinion also engages the rack 5 on the rod 4. A controller CT is connected to steering-torque detection means 8 for detecting steering torque acting on the input shaft 1.

As illustrated in FIG. 7, the controller CT includes basic assist command-value determination means 9 for determining a basic assist command-value in response to a steering torque signal from the above sensor 8, and steering-torque differentiation command-value determination means 10 for differentiating the steering torque detection signal.

The controller CT further includes output control means 11 for controlling the outputs of the electric motor 6. The output control means 11 includes motor-current amplification means 12 for amplifying an input signal, and digital-to-analog conversion means 13 for converting a digital signal into an analog signal. For example, the means 11 can be a pulse width modulation circuit made up of a combination of the motor-current amplification means 12 and the DA conversion means 13.

In order to detect the outputs of the electric motor 6, the output control means 11 has output wiring which is connected to motor current detection means 14. In order to return a motor-current detection signal from the motor-current detection means 14 to the controller CT, the controller CT incorporates analog-to-digital conversion means 15. In other words, the AD conversion means 15 converts the motor-current detection signal in analog form into a digital signal.

In this way, the motor-current detection signal is sent back to the controller CT under the feedback control.

With the above configuration, the control system operates for controlling the electric motor 6 as follows.

As illustrated in FIG. 7, the steering-torque detection signal from the steering-torque detection means 8 is inputted to the basic assist command-value determination means 9. Then, the basic assist command-value determination means 9 outputs a basic assist command-value signal in accordance with the received steering-torque detection signal. The steering-torque detection signal is also inputted to the steering-torque differentiation command-value determination means 10. Then, the steering-torque differentiation command-value determination means 10 outputs a steering-torque differentiation command-value signal in accordance with the received steering-torque detection signal. The steering-torque differentiation command-value signal is added to the above basic assist command-value signal to generate a motor current command-value signal.

The basic assist command-value signal and the steering-torque differentiation command-value signal are digital signals.

The motor current detection means 14 detects motor current outputted from the output control means 11, and sends the detected motor-current detection signal back to the input of the output control means 11 via the AD conversion means 15 placed in the controller.

The motor current detection signal is added to the above motor current command-value signal to generate a motor current control signal. The motor current control signal is inputted to the motor current amplification means 12 in the output control means 11. The motor current amplification means 12 amplifies the received motor current control signal, and then inputs the amplified motor current control signal to the DA conversion means 13.

The DA conversion means 13 outputs motor current according to the amplified motor current control signal to the electric motor 6.

In this way, the system for controlling the electric power steering controls the currents of the electric motor 6 in accordance with the steering-torque detection signal and the motor current detection signal.

In the above system for controlling the electric power steering, the motor current command-value signal is inputted in digital form to the controller CT. That is, the motor current detection signal is converted into a digital signal for addition to the motor current command-value signal.

Thus, it is necessary to convert the motor current detection signal from analog form into digital form. The AD conversion means 15 converts from an analog signal into a digital signal as follows.

FIG. 8 shows a graph illustrating the relationship between the input signal before the AD conversion and the output signal after AD conversion where the motor current detection signal is concerned. Specifically, in FIG. 8, the horizontal axis indicates the input signal of the motor current detection signal and the vertical axis indicates the output signal thereof.

The solid line A in FIG. 8 represents the output when an analog signal represented by the two-dot chain line B is inputted to the AD conversion means 15, and forms a staircase shape as illustrated in FIG. 8. The reason why the output signal forms such a staircase shape will be described next.

The AD conversion means 15 includes a conversion circuit with 10-bit resolution. Specifically, the number of divisions of a digital signal is 2 raised to the tenth power= 1024 bits. The motor current is detected in the range of from −80A to +80A in agreement with the output range of the motor current. Hence, the amount of change in the motor current per bit results in 160A/1024 bits=0.156A/bit.

Since the amount of change in the motor current per bit is 0.156A/bit, 1 bit is shifted every time the motor current detection signal as an input signal changes by 0.156 A. When 1 bit is shifted, the motor current detection signal output sharply increases by 0.156 A. In other words, if the motor current detection signal inputted in analog form continuously changes, the motor current detection signal outputted in digital form takes on discrete values only every 0.156 A.

The points of the sharp changing of the output signal, e.g., points a, b and c in FIG. 8, are hereinafter referred to as "change points".

The fact that the motor current detection signal after the AD conversion takes on discrete values for the amount of change as described above, may produce the following problems When a vehicle travels straight ahead, the driver holds the steering wheel W around the middle position. At this point, the driver typically grips the steering wheel W loosely, and also, to be exact, he/she repeatedly turns the steering wheel W by extremely small degrees in a right or left direction. In other words, the driver oscillates the steering wheel win the right-left direction by extremely small degrees about the middle position.

Such turning of the steering wheel W by extremely small degrees as described above, causes the motor current detection signal to vary in amplitude between positive values and negative values about the zero point. If the above change point is within the amplitude range of the motor current detection signal, the output signal after the AD conversion repeats a sharp increase and decrease every time the motor current detection signal passes through the change point.

Further, as described above, the output signal after the AD conversion is added to the motor current command-value signal to form the motor current control signal. Hence, if the output signal after the AD conversion repeats a sharp increase and decrease, the motor current control signal also repeats a sharp increase and decrease. In addition, the motor current flowing through the electric motor 6 also repeats a sharp increase and decrease.

Such a repeating of the sharp increase and decrease in the motor current causes a problem of a pulsing motion being produced in the steering wheel W. If the pulsing motion is produced in the steering wheel W positioned around the middle position, the driver feels discomfort on his/her hands gripping the steering wheel W, because, due to not only a small motor current but also a small steering force and a small reaction force from the travelling wheels when the steering wheel W is positioned around the middle position, even if the motor current changes only slightly, the pulsing motion is readily transferred to the driver's hands gripping the steering wheel W.

On the other hand, for preventing the pulsing motion, it is necessary to reduce the amount of change in the motor current per bit in the AD conversion. In turn, for reducing the amount of change in the motor current per bit, one idea is to use an AD conversion circuit with more than 10-bit resolution. However, an AD conversion circuit with more than 10-bit resolution is costly, and this raises the cost of the system for controlling the electric power steering. Thus, a high-cost AD conversion means cannot be used.

SUMMARY OF THE INVENTION

It is an object of the present invention to provide a system for controlling electric power steering in which, when a motor current detection signal is small, the resolution of the signal is increased for achieving control without a pulsing motion occurring.

The present invention is based on a system for controlling electric power steering which includes: an electric motor for generating an assist force; steering torque detection means for detecting steering torque; basic assist command-value determination means for determining a basic assist command-value from a steering torque detection signal; steering torque differentiation command-value determination means for determining a steering torque differentiation command-value from the steering torque detection signal; motor current detection means for detecting output of the electric motor; and output control means for controlling output of the electric motor, in which the output control means controls the output of the electric motor in response to a motor current control signal at a reference level resulting from the addition of a motor current detection signal and a motor current command-value signal consisting of the basic assist command-value and the steering torque differentiation command-value.

The feature in a first aspect of the present invention is that the system includes: signal level decision means for selecting a reference level or an amplification level in response to the steering torque detection signal or the motor current command-value signal; first adjustment means for carrying out the selection of the reference level or the amplification level for a signal level of the motor current command-value signal; second adjustment means for carrying out the selection of the reference level or the amplification level for a signal level of the motor current detection signal; analog-to-digital conversion means for converting the signal outputted from the second adjustment means into a digital signal; and third adjustment means for adjusting the motor current control signal to be at the reference level, in which each of the first adjustment means and the second adjustment means decides the signal level in response to a signal level decision signal sent from the signal level decision means, and the third adjustment means adjusts the motor current control signal to be at the reference level in response to the signal level decision signal and inputs the adjusted signal to the output control means.

According to the first aspect, when the steering wheel is around the middle position and the motor current detection signal is converted into a digital signal, the signal level is switched to allow the conversion at high resolution. For this reason, the motor current detection signal in digital form has a minimum of sharp increases or decreases as compared with the conventional example. Minimizing the sharp changes in the motor current detection signal allows the motor current control signal to be more strictly controlled as compared with the conventional example. This allows a more strict control for the motor current output in response to the motor current control signal.

As a result, when the steering wheel is held around the middle position, it is possible to prevent the pulsing motion.

The feature in a second aspect based on the first aspect is that the system further includes signal amplification means with amplification factor N provided at the output of the analog-to-digital conversion means for multiplying the motor current detection signal after the AD conversion by N times, wherein the steering torque differentiation command-value with respect to the steering torque detection signal is multiplied by N times to he defined as a steering torque differentiation command-value determination signal, and the basic assist command-value with respect to the steering torque detection signal is multiplied by N times to be defined as a basic assist command-value determination signal, and the signal resulting from the addition of the steering torque differentiation command-value determination signal and the basic assist command-value determination signal is defined as a motor current command-value signal.

According to the second aspect, the basic assist command-value determination means multiplies a basic assist command-value with respect to a steering torque detection signal by N times and outputs the result as a basic assist command-value determination signal. The steering torque differentiation command-value determination means multiplies a steering torque differentiation command-value with respect to the steering torque detection signal by N times, and outputs the result as a steering torque differentiation command-value determination signal. With this design, the motor current command-value signal resulting from the addition of the basic assist command-value determination signal and the steering torque differentiation command-value signal can be more strictly controlled. It is possible to achieve the control with a minimized pulsing motion in the range of the full output of the motor current.

The feature in a third aspect based on the first or second aspect is that the system further includes a filter provided minimally at either one of the outputs of the steering torque differentiation command-value determination means and the basic assist command-value determination means.

According to the third aspect, a filter is provided minimally at either one of the outputs of the basic assist command-value determination means and the steering torque differentiation command-value determination means. With the filter, not only the motor current command-value signal but also motor current control signal are smoothed. This achieves the control with the hardly any pulsing motion produced in the range of the full output of the motor current.

The feature in a fourth aspect based on the aforementioned aspects is that when the signal level decision means switches the signal level in response to the steering torque detection signal or the motor current command-value signal, the switching from the reference level to the amplification level and the switching from the amplification level to the reference level are performed on different steering torque detection signals or motor current command-value signals each of which the signal level is to be switched.

According to the fourth aspect, the signal level decision means has hysteresis characteristics for the signal level determination. Due to the hysteresis characteristics provided for the signal level determination, the motor-current output can be prevented from producing sharp increases or decreases at the point of switching the signal level. As a result, if the motor-current output changes in amplitude around the point of switching the signal level, the pulsing motion is not produced in the steering wheel.

BRIEF DESCRIPTION OF THE DRAWINGS

FIG. 7 is a block diagram of a conventional example.

FIG. 8 is a graph showing the relationship between an input signal and an output signal caused by AD conversion in the conventional example.

DETAILED DESCRIPTION OF THE PREFERRED EMBODIMENTS

Figure 1:
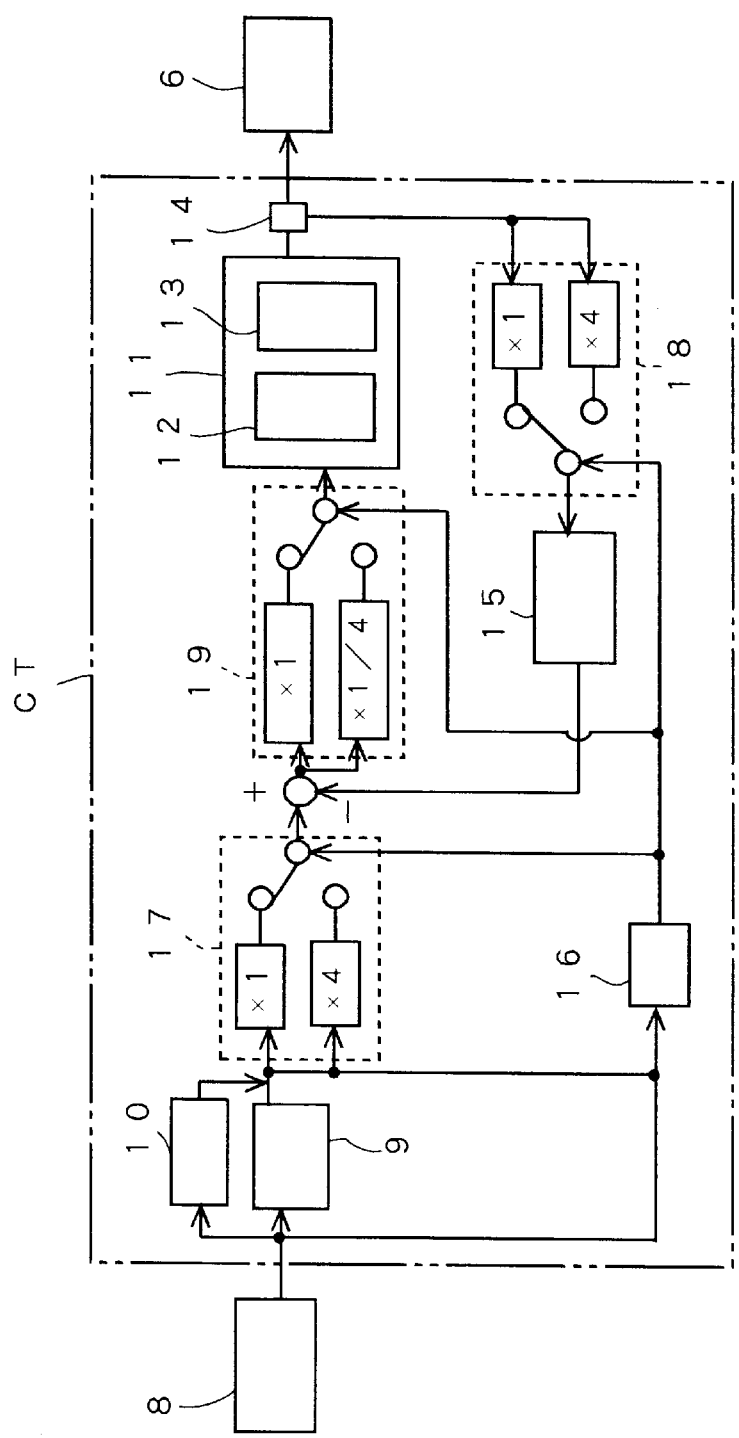
FIG. 1 is a block diagram of a first embodiment according to the present invention.
Figure 2:
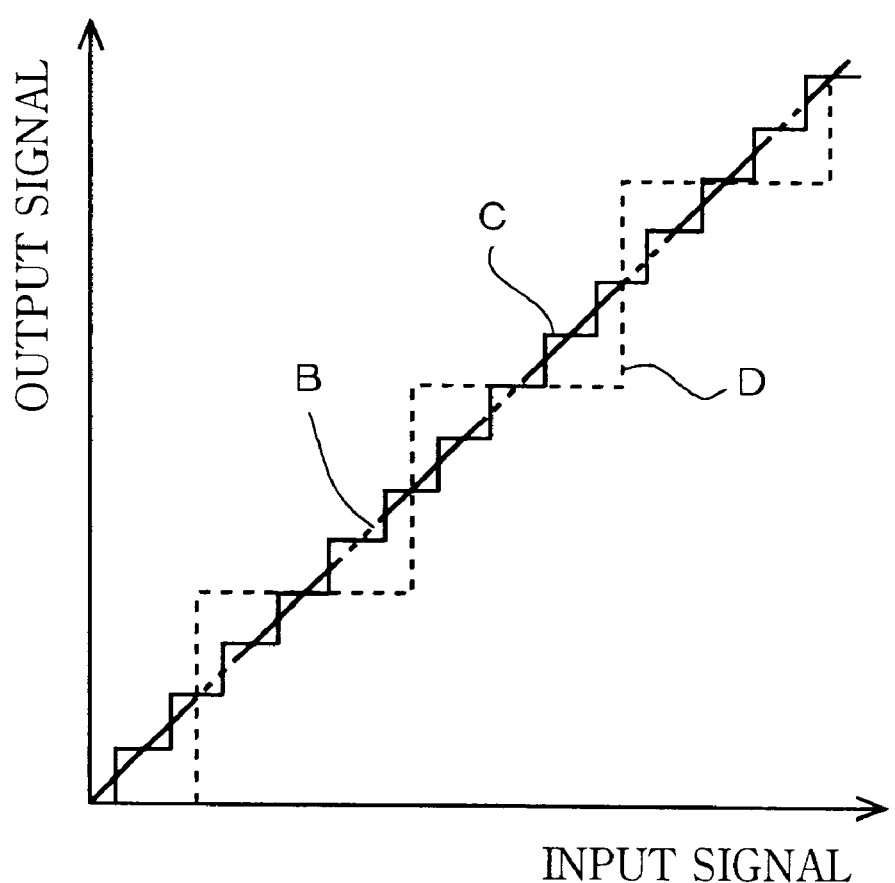
FIG. 2 is a graph showing the relationship between an input signal and an output signal which is caused by AD conversion according to the first invention.

FIG. 1 and FIG. 2 illustrate a first embodiment according to the present invention. The following is a description concentrated on points differing from the conventional example explained above. The same components as those in the conventional example are designated with the same reference numerals and a detailed description is omitted.

As illustrated in FIG. 1, a system for controlling electric power steering includes a signal level decision means 16 which receives a steering-torque detection signal from a steering torque detection means 8, and also receives a motor current command-value signal. The signal level decision means 16 produces a decision on selecting either one of two signal levels for use in control operation in response to the steering torque detection signal or the motor current command-value signal, in which the two signal levels mean a reference level and an amplification level.

The signal level decision means 16 sends a signal level decision signal for indicating the signal level decided on to first adjustment means 17, second adjustment means 18 and third adjustment means 19 which will be described below.

As illustrated in FIG. 1, the first adjustment means 17 is provided at the output of steering-torque differentiation command-value determination means 10 and basic assist command-value detection means 9. The first adjustment means 17 is configured to carry out the selection of the reference level or the amplification level for the level of the input signal. The first adjustment means 17 selects one or other of the two signal levels in response to the signal level decision signal.

In the first embodiment, when the reference level is selected, the means 17 multiplies the input signal by an amplification factor of one for outputting. As illustrated in FIG. 1, an amplifier is provided for multiplying the input signal by one for outputting. On the other hand, when the amplification level is selected, the means 17 multiplies the input signal by an amplification factor of 4 for outputting. As illustrated in FIG. 1, an amplifier is provided for multiplying the input signal by 4 for outputting.

When the signal level decision signal indicates the reference level, the first adjustment means 17 selects the reference level. That is, the first adjustment means 17 multiplies the input signal by one for outputting. On the other hand, when the signal level decision signal indicates the amplification level, the first adjustment means 17 selects the amplification level. That is, the first adjustment means 17 multiplies the input signal by 4 for outputting.

Thus, the first adjustment means 17 outputs a motor current command-value signal resulting from an addition of a steering-torque differentiation command-value signal and a basic assist command-value signal at the signal level selected as described above.

As illustrated in FIG. 1, the second adjustment means 18 is placed at the output from motor current detection means 14. As in the first adjustment means 17, the second adjustment means 18 is configured to select a reference level or an amplification level for the signal level of the input signal.

Specifically, the second adjustment means 18 selects either one of the two signal levels in response to the signal level decision signal. When the signal level decision signal indicates the reference level, the second adjustment means 18 multiplies the input signal by one for outputting. On the other hand, when the signal level decision signal indicates the amplification level, the second adjustment means 18 multiplies the input signal by tour for outputting.

Hence, the second adjustment means 18 inputs the motor current detection signal to analog-to-digital conversion means at the signal level selected above.

The motor current command-value signal is a digital signal, but the motor current detection signal inputted to the second adjustment means 18 is an analog signal. For this reason, the motor current detection signal outputted from the second adjustment means 18 is inputted to the AD conversion means 15 which includes an AD conversion circuit with 10-bit resolution as in the case of the conventional example.

The controller CT further includes the third adjustment means 19 receiving a motor current control signal resulting from the addition of the motor current command-value signal and the motor current detection signal. The third adjustment means 19 adjusts the signal level of the input signal to the reference level, and inputs the adjusted signal to motor current amplification means 12.

When the signal level decision signal indicates the reference level, the third adjustment means 19 multiplies the input signal by one for outputting. On the other hand, when the signal level decision signal indicates the amplification level, the third adjustment means 19 divides the input signal by four for outputting.

Thus, the third adjustment means 19 outputs the motor current control signal at the reference level.

An explanation will be given next for the reason why the third adjustment means 19 divides the input signal by tour when the signal level decision signal indicates the amplification level in this way.

The signal inputted to the third adjustment means 19 is the motor current control signal resulting from the addition of a motor current command-value signal and a motor current detection signal. In this case, the motor current command-value signal has been quadruped by the first adjustment means 17. Further, the motor current detection signal has been quadruped by the second adjustment means 18. Therefore, the motor current control signal resulting from the addition of the motor current command-value signal and the motor current detection signal has four times the signal level of the reference level. Hence, the third adjustment means 19 divides the input signal by an amplification factor of four to return the signal level of the input signal to the reference level, and then outputs the input signal.

The signal level decision means 16 selects a signal level in response to the steering torque detection signal or the motor current command-value signal, as described below.

When the steering torque detection signal or motor current command-value signal has a smaller value than a predetermined value, the signal level decision means 16 outputs a signal for indicating a selection of the amplification level. The time when the steering torque detection signal is smaller than the predetermined value is the time when the steering wheel W is positioned around the middle position. The time then the motor current command-value signal is smaller than the predetermined value is the time when the motor current command-value falls within the range of from −20A to +20A.

Conversely, when the steering torque detection signal has a larger value than the predetermined value, the signal level decision means 16 outputs a signal for indicating a selection of the reference level. The time when the steering torque detection signal is larger than the predetermined value is the time when the steering wheel W is positioned away from the middle position such as when the steering wheel W is turned. The time when the motor current command-value signal is larger than the predetermined value is the time when the motor current command-value falls within the range of from −80A to −20A or the range of from +20A to +80A.

The following is a description of the case when the signal level decision means 16 decides a signal level from the steering torque detection signal.

With the aforementioned configuration, when the steering torque detection signal is smaller than the predetermined value, it is possible to increase the resolution in the AD conversion to 4 times higher than that in the conventional example, which will be described next.

In a smaller steering-torque detection signal, the signal level decision signal is defined as a signal for indicating a selection of the amplification level to allow the second adjustment means 18 to select the amplification level. That is, the motor current detection signal detected by the motor current detection means 14 is quadrupled and inputted to the A-D conversion means 15.

When the steering torque detection signal is smaller than the predetermined value as described above, the second adjustment means 18 quadruples "from −20A to +20A" which is the detection range for the motor current. Thus, the amount of the change in current per bit in the AD conversion results apparently in a value resulting from dividing the current detection range of from −80A to +80A by 1024 bits.

However the fact is that the 40A of the above detection range of from −20A to +20A are divided by 1024 bits. This is because the quadrupled signal is converted into a digital signal, and then divided by an amplification factor of 4 by the third adjustment means 19 to return to the reference level.

Consequently, in the AD conversion, the actual amount of the change in motor current per bit is 40A/1024 bits= 0.039A/bit.

As described in the conventional example, the amount of the change in motor current per bit is conventionally 0.156A/bit. However, the amount of the change in motor current in the first embodiment is one quarter of that in the conventional example.

This will be further described with reference to FIG. 2.

FIG. 2 is a graph for giving a comparison of the conventional AD conversion and the AD conversion in the first embodiment when the motor current detection signal is smaller than the predetermined value. The horizontal axis indicates the motor current detection signal in analog form and the vertical axis indicates the motor current detection signal in digital form.

The solid line C in FIG. 2 represents the digital signal output converted by the AD conversion in the first embodiment, where the analog signal indicated by two-dot chain line B is the input signal. The broken line D in FIG. 2 represents the digital signal converted by the AD conversion in the conventional example as illustrated in FIG. 8.

For the sake of comparison, the solid line C is plotted assuming the case of the signal having been returned to the reference level by the third adjustment means 19.

As is clear from FIG. 2, each step on the solid line C is one quarter of that of the broken line D, which allows outputs of signals at intervals closer than those in the conventional example in response to the input signals. In other words, the resolution in the AD conversion can be four times higher than that of the conventional example. The scale factor of the resolution is naturally the scale factor set at the amplification level.

The following is a description of the operation of the system for controlling the electric power steering in the first embodiment. First, the driver sharply turns the steering wheel W so that the steering torque takes a value larger than the predetermined value. In this case, the signal level decision means 16 selects the reference level, and inputs the signal level decision signal for indicating the selection of the reference level to the first adjustment means 17, the second adjustment means 18 and the third adjustment means 19.

Based on the received signal level decision signal, each of the first adjustment means 17, the second adjustment means 18 and the third adjustment means 19 selects the reference level for an input signal to output the input signal at the reference level without changing the signal level.

For this reason, the motor current command-value signal resulting from the addition of the steering torque differentiation command-value and the basic assist command-value makes no change in the reference level and is output through the first adjustment means 17. A motor current detection signal also makes no change in the reference level and is applied through the second adjustment means 18 to the A-D Conversion means 15. The motor current detection signal outputted from the A-D conversion means 15 is added to the motor current command-value signal to generate the motor current control signal.

Consequently, the resulting motor current control signal is also a digital signal at the reference level.

The third adjustment means 19 inputs the motor current control signal at the reference level without a change in the signal level to the motor current amplification means 12. The motor current amplification means 12 amplifies the motor current control signal, and inputs the amplified signal to the digital-to-analog conversion means 13. The DA conversion means 13 outputs, in response to the received input, the motor current converted into an analog signal to the electric motor 6.

In this way, when the steering torque detection signal is larger than the predetermined value, it is possible to perform a similar control to that in the conventional example. Due to the steering-torque detection signal being larger than the predetermined value, even if the motor current detection signal is changed to produce a pulsing motion, the pulsing motion does not affect the driver The following is a description of the case when the driver holds the steering wheel W around the middle position.

The driver holds the steering wheel W around the middle position so that the steering torque detection signal takes a smaller value than the predetermined value. At this point, the motor current detection signal has a value within the range of from −20A to +20A. The signal level decision means 16 selects the amplification level of the signal. A signal level decision signal for indicating the selection of the amplification level is inputted to the first adjustment means 17, the second adjustment means 18 and the third adjustment means 19. Based on the received signal level decision signal, the first adjustment means 17 and the second adjustment means 18 select the amplification level. The third adjustment means 19 selects the setting for dividing the input signal by an amplification factor of 4 in order to adjust the input signal to be at the reference level.

After passing through the first adjustment means 17, the motor current command-value signal resulting from the addition of the steering torque differentiation command-value and the basic assist command-value is changed into a signal at a level four times as high as the reference level.

The second adjustment means IS adjusts the level of the motor current detection signal to be four times as high as the reference level and then applies it to the A-D conversion means 15. The signal from the A-D conversion means 15 is added to the motor current command-value signal to generate the motor current control signal.

Thus, the motor current control signal results in a signal at a level four times as high as the reference level. The third adjustment means 19 divides the motor current control signal by an amplification factor of 4 to change the level to the reference level.

At this point, the motor current detection signal which is part of the motor current control signal is converted into a digital signal at a resolution four times as high as that in the conventional example as described above. Therefore,the motor current control signal has precision higher than that in the conventional example in accordance with the change of the motor current detection signal.

The motor current control signal which has been returned to the reference level is amplified by the motor current amplification means 12. The amplified signal is inputted to the DA conversion means 13. The DA conversion means 13 outputs, in response to the received signal, the motor current of an analog value to the electric motor 6.

As described above, in the case of positioning the steering wheel W around the middle position, when the motor current detection signal is converted into a digital signal, the conversion is conducted at a resolution four times as high as conventional resolution. For this reason, as compared with the conventional example, the motor current detection signal in digital form has a minimum of sharp increase and decrease. This minimizing of sharp changes in the motor current detection signal, the motor current control signal consisting of the motor current detection signal and the motor current command-value signal results also in a signal controlled more strictly as compared with that in the conventional example. This stricter control of the motor current control signal allows the motor-current output to be more strictly controlled in accordance with the motor current control signal.

Consequently, when the steering wheel W is held around the middle position, it is possible to minimize the pulsing motion.

In the first embodiments the scale factor of the amplification level is not limited to four, and a given real number can be set. For example, the scale factor of the amplification level can be set at a value dividing the full motor-current output by the range of motor-current output in which the pulsing motion is produced.

In the first embodiment, each of the first adjustment means 17 and the second adjustment means 18 includes the amplifier for multiplying the input signal by one and the amplifier for quadrupling the input signal. The separate amplifiers are not limited. Each of the first and second adjustment means 17 and 18 may include a single amplifier. When the single amplifier is used, the amplifier is adapted to be switched between the amplification factors of a single time and tour times. The switching is set to be performed by the signal level decision signal.

Figure 3:
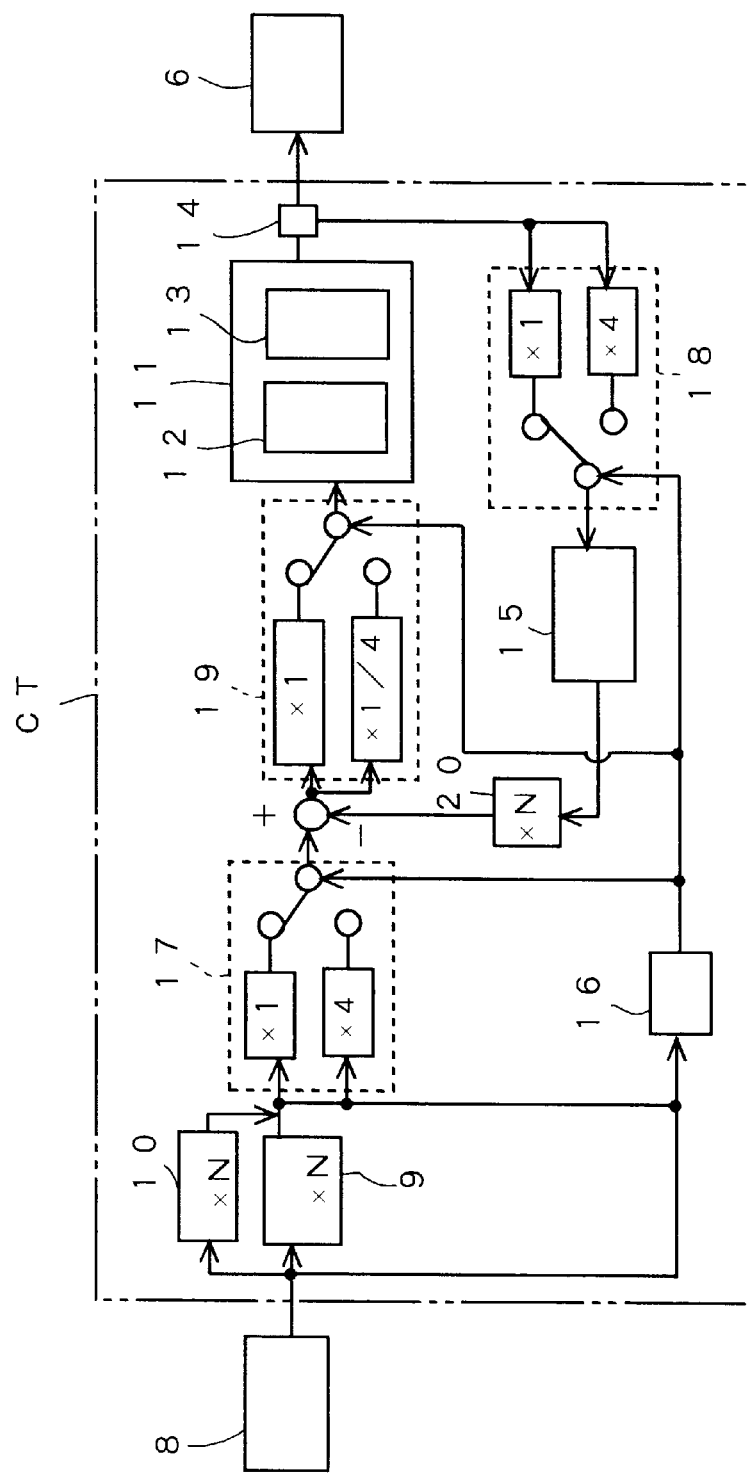
FIG. 3 is a block diagram of a second embodiment.

A second embodiment illustrated in FIG. 3 has a configuration in addition to the first embodiment as follows.

The basic assist command-value determination means 9 multiplies the basic assist command-value with respect to the steering-torque detection signal in analog form by N times, and outputs the resultant value as a basic assist command-value determination signal in digital form. The steering-torque differentiation command-value determination means 10 multiplies the differentiation command-value with respect to the steering-torque detection signal by N times, and outputs the resultant value as a steering-torque differentiation command-value determination signal. Further signal amplification means 20 with an amplification factor N is provided at the output of the A-D conversion means 15, for multiplying the motor current detection signal after the A-D conversion by N times. The amplification factor N is a predetermined real number.

The following is a description concentrated on points differing from the first embodiment described above. The same components as those in the first embodiment are designated with the same reference numerals and a detailed description is omitted.

The basic assist command-value determination means 9 specifies a basic assist command-value with respect to the steering-torque detection signal on the basis of a table for determining basic assist command-values. With the above configuration, the basic assist command-value determination means 9 multiplies the basic assist command-value with respect to the steering-torque detection signal by N times, and outputs the resultant signal as the basic assist command-value determination signal in digital form. Therefore, as in the A-D conversion in the first embodiment, it is possible to increase the resolution of the basic assist command-value to N times as compared with the conventional example. Similarly, the steering-torque differentiation command-value can be increased in resolution to N times.

A motor current command-value signal resulting from the addition of the steering-torque differentiation command-value determination signal and the basic assist command-value determination signal is also increased in resolution N times, but the signal level thereof is the reference level.

According to the second embodiment, the basic assist command-value and the steering-torque differentiation command-value can be increased in resolution N times. Hence, the motor current detection signal is more strictly detected as in the first embodiment, and additionally the motor current command-value signal is more strictly controlled. A signal resulting from the addition of such a motor current command-value signal to the motor current detection signal is applied as a motor current control signal to the output control means 11 This configuration achieves the control with a minimum of pulsing motion within the range of the full output of the motor current.

Even in a low resolution of the motor current detection means 14 with respect to the motor current command-value, the feedback control allows the motor current detection means 14 to output at an intermediate value of the resolution, resulting in the strict output of motor current.

Figure 4:
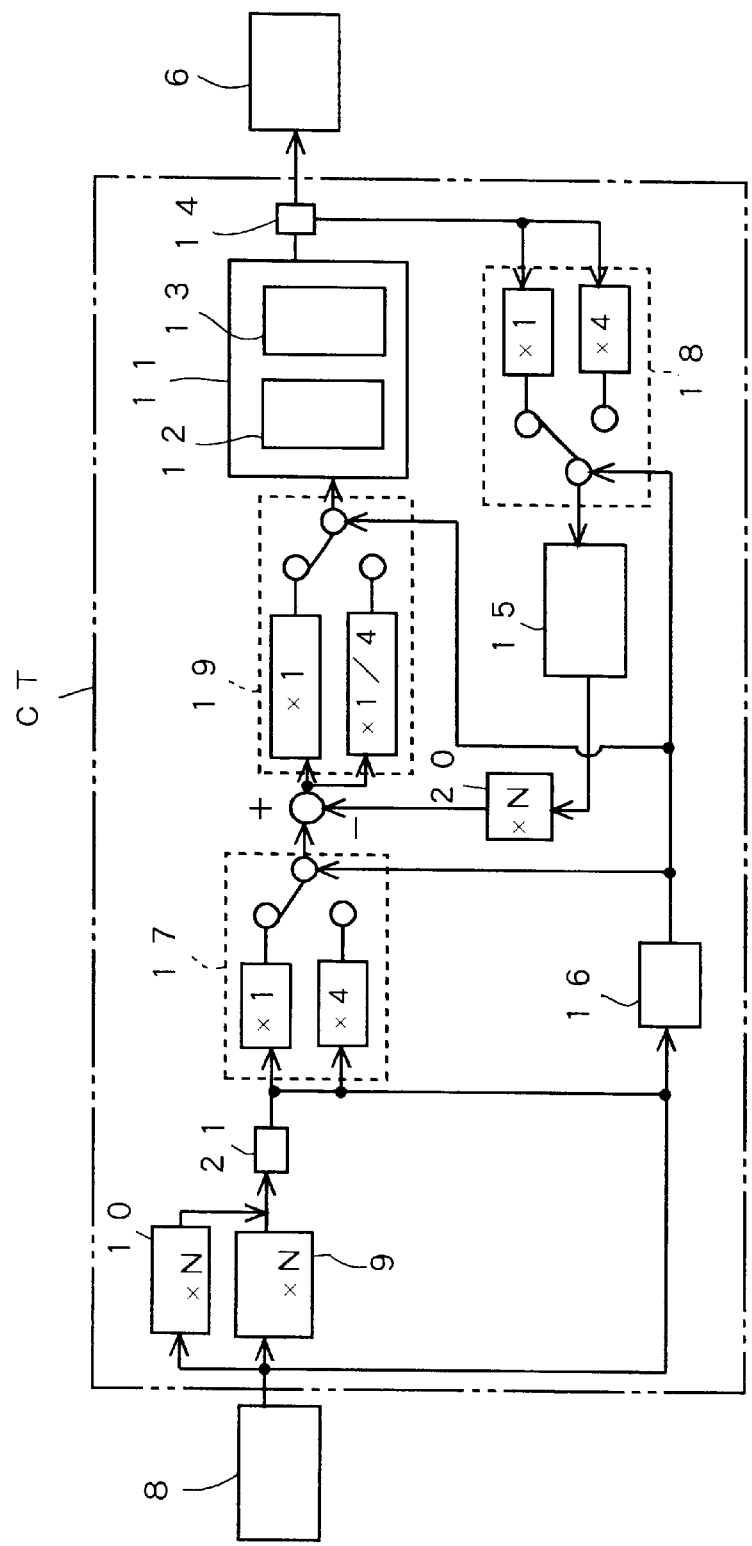
FIG. 4 is a block diagram of a third embodiment.

A third embodiment illustrated in FIG. 4 has a configuration in addition to the second embodiment, in which a filter 21 is provided at the output connected to the basic assist command-value determination means 9 and the steering-torque differentiation command-value determination means 10. The following is a description concentrated on points differing from the second embodiment. The same components as those-in the second embodiment are designated with the same reference numerals and a detailed description is omitted.

The filter 21 smoothes the received motor current command-value signal for output. Hence, the motor current command-value signal in digital form can be smoothed in the same way as an analog signal.

As a result, the motor current command-value signal is smoother than that in the second embodiment. Due to the smooth motor current command-value signal, the motor current control becomes a smooth signal. Since such a motor current control signal is applied to the output control means 11, the control is achieved with hardly any pulsing motion produced in the range of the full output of the motor current.

In the above configuration, the filter 21 is provided at the output connected to the basic assist command-value determination means 9 and the steering-torque differentiation command-value determination means 10, but the filter 21 may be provided minimally at either one of the outputs of the steering-torque differentiation command-value determination means 10 and the basic assist command-value determination means 9, as the effect of smoothing the motor current command-value signal can be provided even if the filter 21 is provided at one of those outputs Further, the filter 21 illustrated in the third embodiment can be provided in the first embodiment. Specifically, when the filter 21 is provided in the first embodiment under the conditions illustrated in the third embodiment, the motor current command-value signal becomes smooth, and thus the motor current control signal is smoother. Therefore, as compared with the first embodiment, the pulsing motion can be minimized when the steering wheel W is around the middle position. Further, the output of the motor current can be smoother in the range of the full output of the motor current.

In all the aforementioned embodiments, the signal level decision means 16 may have hysteresis characteristics for the signal level determination. Specifically, when the signal level decision means 16 switches the signal level in response to the steering torque detection signal or the motor current command-value signal, the switching from the reference level to the amplification level and the switching from the amplification level to the reference level are performed on the different steering torque detection signals or motor current command-value signals each of which the signal level is to be switched. This configuration will be explained below.

Figure 5:
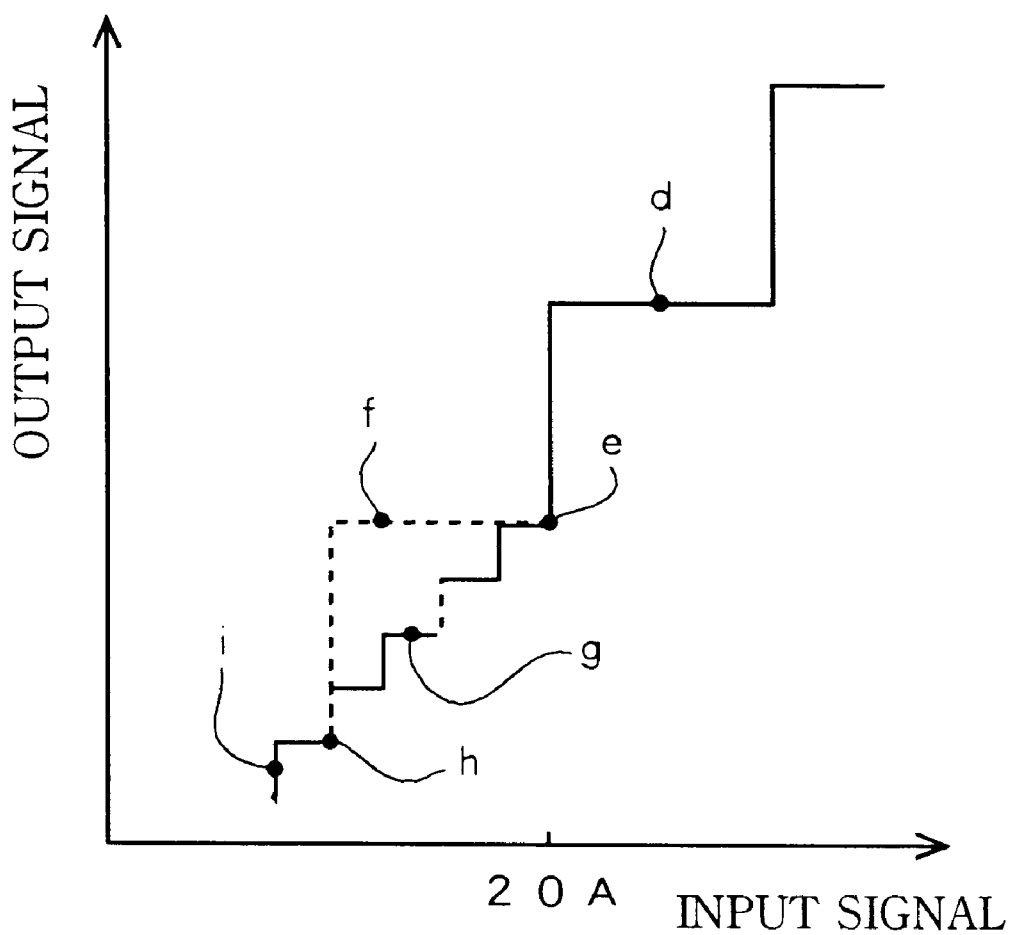
FIG. 5 is a graph showing hysteresis of a motor control and a motor output.
Figure 6:
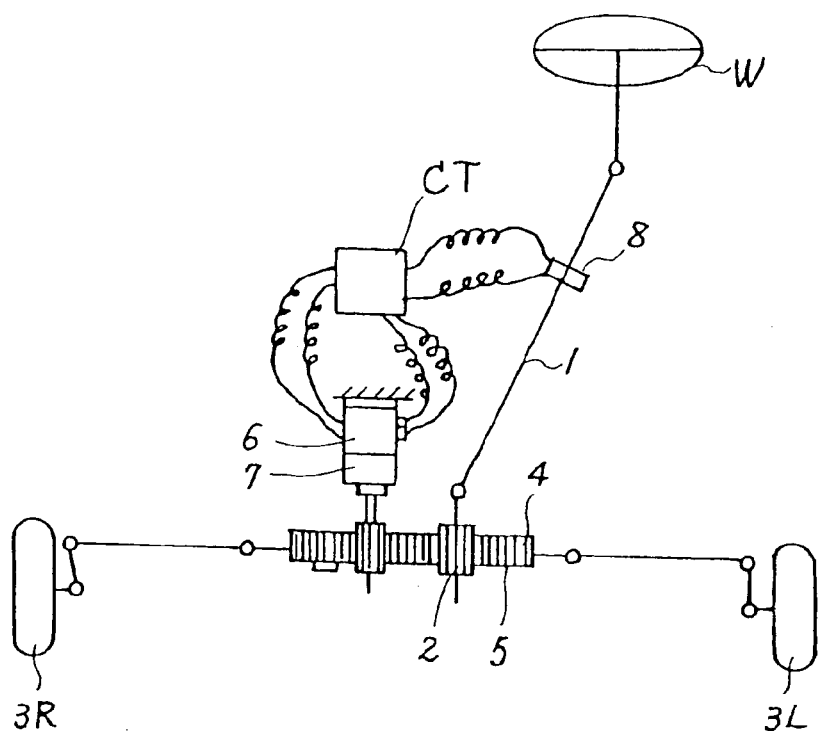
FIG. 6 is a schematic diagram of a conventional control system.

FIG. 5 is a graph illustrating the input signal and the output signal in the A-D conversion operated by the A-D conversion means 15, which represents the case when the current value of the motor current detection signal is around 20A. As illustrated in FIG. 5, when the input signal is larger than 20A, the output signal results in a signal at the reference level indicated by the solid line. However, when the input signal is smaller than 20A, the output signal results in a signal at the amplification level indicated by a broken line in FIG. 5. As illustrated in FIG. 5, when the input signal is smaller than 20A, the resolution in the AD conversion is quadrupled as described above.

Further, as illustrated in FIG. 5, the output signal can have the graph expressed by the broken line. The graph expressed by the broken line is for a signal at the reference level. That is, the graph for the reference level is extended toward the graph for the amplification level by 0.156A.

Point h in FIG. 5 represents the point of switching the signal level from the reference level to the amplification level. Point e in FIG. 5 represents the point of switching the signal level from the amplification level to the reference level.

With the above configuration, the operation is performed as follows.

In the case where the input signal becomes smaller from point d as illustrated in FIG. 5, the output signal reaches point f via point e. At this point, if the input signal is smaller than 20A, the signal level is not switched to cause the output signal to bypass point f. When the input signal becomes even smaller it changes as far as the point h. When the input signal is in the point h, the above configuration switches the signal level to the amplification level.

On the other hand, in the case where the input signal becomes larger from point i as illustrated in FIG. 5, the output signal reaches point g via point h. When the input signal becomes even larger it changes as far as the point e. When the input signal is in the point e, the above configuration switches the signal level to the reference level.

The reason why the signal level is switched at the point h when the output signal is smaller than 20A as described above, is that in the switching of the signal level at the point e, when the output signal changes in amplitude around the output of the point e, sharp increases or decreases are produced in the motor-current output.

When the output signal becomes larger, the signal level is not switched at the point h but at the point e. This is because when the output signal changes in amplitude around the point h, sharp increases or decreases are produced in the motor-current output.

In this way, due to the hysteresis characteristics provided for the signal level determination, the motor-current output is prevented from sharply increasing or decreasing at the point of switching the signal level. Hence, even if the motor-current output changes in amplitude around the point of switching the signal level, the pulsing motion is not produced in the steering wheel W.

Explanation of Reference Numerals

8 STEERING-TORQUE DETECTION MEANS
   9 BASIC ASSIST COMMAND-VALUE DETERMINATION MEANS
   10 STEERING TORQUE DIFFERENTIATION COMMAND-VALUE
Determination Means
   11 OUTPUT CONTROL MEANS
   12 MOTOR-CURRENT AMPLIFICATION MEANS
   13 DA CONVERSION MEANS
   14 MOTOR CURRENT DETECTION MEANS
   15 AD CONVERSION MEANS
   16 SIGNAL LEVEL DECISION MEANS
   17 FIRST ADJUSTMENT MEANS
   18 SECOND ADJUSTMENT MEANS
   19 THIRD ADJUSTMENT MEANS
   20 SIGNAL AMPLIFICATION MEANS
   21 FILTER

We claim:

1. A system for controlling electric power steering including an electric motor for generating an assist force; steering torque detection means for detecting steering torque; basic assist command-value determination means for determining a basic assist command-value from a steering torque detection signal; steering torque differentiation command-value determination means for determining a steering torque differentiation command-value from the steering torque detection signal; motor current detection means for detecting output of said electric motor; and output control means for controlling output of said electric motor, in which the output control means controls the output of the electric motor in response to a motor current control signal at a reference level resulting from the addition of a motor current detection signal and a motor current command-value signal consisting of the basic assist command-value and the steering torque differentiation command-value, said system for controlling the electric power steering, comprising:

signal level decision means for selecting a reference level or an amplification level in response to the steering torque detection signal or the motor current command-value signal;

first adjustment means for carrying out the selection of the reference level or the amplification level for a signal level of the motor current command-value signal;

second adjustment means for carrying out the selection of the reference level or the amplification level for a signal level of the motor current detection signal, analog-to-digital conversion means for converting the signal outputted from said second adjustment means into a digital signal; and third adjustment means for adjusting the motor current control signal to be at the reference level, wherein each of said first adjustment means and said second adjustment means decides the signal level in response to a signal level decision signal sent from said signal level decision means, and said third adjustment means adjusts the motor current control signal to be at the reference level in response to the signal level decision signal and inputs the adjusted signal to said output control means.

2. The system for controlling the electric power steering according to claim 1, further comprising signal amplification means with amplification factor N provided at the output of said analog-to-digital conversion means for multiplying the motor current detection signal after the AD conversion by N times, wherein the steering torque differentiation command-value with respect to the steering torque detection signal is multiplied by N times to be defined as a steering torque differentiation command-value determination signal, and the basic assist command-value with respect to the steering torque detection signal is multiplied by N times to be defined as a basic assist command-value determination signal, and the signal resulting from the addition of the steering torque differentiation command-value determination signal and the basic assist command-value determination signal is defined as a motor current command-value signal.

3. The system for controlling the electric power steering according to claim 1, further comprising a filter provided minimally at either one of the outputs of said steering torque differentiation command-value determination means and said basic assist command-value determination means.

4. The system for controlling the electric power steering according to claim 1, wherein when said signal level decision means switches the signal level in response to the steering torque detection signal or the motor current command-value signal, the switching from the reference level to the amplification level and the switching from the amplification level to the reference level are performed on the different steering torque signals or motor current command-value signals of which the signal levels are to be switched.

* * * * *